Patented Sept. 11, 1928.

1,683,731

UNITED STATES PATENT OFFICE.

JAMES W. SCHWAB, OF GULF, TEXAS, ASSIGNOR TO TEXAS GULF SULPHUR COMPANY, OF BAY CITY, TEXAS, A CORPORATION OF TEXAS.

METHOD OF TREATING SULPHUR.

No Drawing.      Application filed December 27, 1926.   Serial No. 157,423.

This invention relates to the treatment of sulphur, and more particularly to the treatment of sulphur containing impurities, such as small amounts of organic impurities, the presence of which impart to the sulphur an abnormal color or other objectionable property. The invention has for its object the provision of an improved method of treating such sulphur to improve its color and/or to ameliorate its other objectionable properties.

This application is a continuation in part of my co-pending application Serial No. 689,564 for the method of treating sulphur.

Sulphur is commonly produced or mined by underground fusion in accordance with the well-known Frasch process. In this process a fusing fluid, such as superheated water under pressure, is conveyed to the underground sulphur deposit where its heat is utilized in fusing the sulphur and the fused or melted sulphur is collected in the so-called sulphur wells and raised to the surface of the ground in a molten condition by suitable agencies, such, for example, as an air lift pump. The molten sulphur is then permitted to solidify and forms what is known in the industry as crude sulphur.

Crude sulphur as mined by the Frasch process is more nearly a pure substance than many carefully purified chemically pure chemicals. It often assays 99.95% sulphur and averages well over 99.5% sulphur. But crude sulphur always contains, in addition to minute amounts of inorganic matter, traces of impurities which affect its burning qualities and sometimes its color. These latter impurities are largely organic matter and are present in the sulphur on account of its contact with petroleum or bituminous substances which occur in the sulphur-bearing formations. The organic impurities are usually referred to as "oil."

Ordinarily crude sulphur generally assays from 0.01% to 0.05% oil, but frequently contains larger amounts of oil. There does not seem to be any direct relationship between the amount of oil present in the sulphur and its color. Sulphur containing 0.02% oil may be dark brown in color, while other sulphur containing as much as 0.07% to 0.08% oil may be a bright yellow color.

Oil and sulphur react very rapidly at the temperatures prevailing at the burning point of sulphur itself and form black, asphaltic compounds which discolor the sulphur making it nearly black, and when burned an asphaltic film forms on the surface of the sulphur which ultimately extinguishes the flame. I have found that oil and sulphur react very slowly at the temperatures ordinarily prevailing in mining operations. If, however, crude sulphur is held for some time at the temperatures prevailing in mining operations, it loses its normal bright yellow color and becomes darker yellow or brownish in color. So, in actual mining, if sulphur as it is melted in the deposit does not happen to drain readily to a producing well, it may remain in the liquid state long enough for some of the oil to react with it and cause it to lose its characteristic bright yellow color and become dark. And, should the temperature of the molten sulphur become abnormally high so that the sulphur becomes viscous, then the color of the sulphur becomes dark more rapidly. The particular shade (that is color) of the solid sulphur probably depends upon how long it had remained in the liquid state before it finally reached a producing well and was removed from the deposit and solidified, and perhaps also, to some extent, upon the temperature attained by the sulphur while molten.

While the color of crude sulphur can be fairly well controlled by careful placing of producing wells with reference to the portion of the sulphur deposit being mined, still there are often wells that produce dark or abnormally colored sulphur. In ordinary mining practice, it seems impossible not to produce some sulphur which in chemical composition and properties is practically identical with bright yellow sulphur, but which is dark or abnormal in color. The color of this dark sulphur leads those accustomed to bright sulphur to assume that it is inferior in quality, and is, therefore, a drawback to the sale of a product which is equal in quality to bright yellow sulphur.

The present invention contemplates the provision of a method of treating dark or abnormally colored sulphur to improve its color and more particularly to restore dark sulphur to its normal and characteristic bright yellow color. The invention also contemplates the provision of an improved method of removing oil and similar impurities from sulphur. In its broad aspect, the invention involves treating the sulphur in a molten condition with adsorbent carbon in the form of charcoal, activated carbon or decolorizing carbon, hereinafter generically referred to as activated carbons, and subsequently separating the sulphur from the adsorbent carbon material and such adsorbed or occluded impurities as have become associated therewith. Thus, the invention involves bringing dark colored sulphur, in a molten or liquid condition, into intimate contact with adsorbent activated carbon capable of adsorbing or occluding the dark colored impurities and in some cases a part of the oil. After a varying period of contact, depending to some extent upon the activated carbon used, of from a few minutes to several hours, the sulphur is separated from the adsorbtive carbon and its adsorbed or occluded impurities by any appropriate means. The product is sulphur of a bright yellow color which may or may not contain noticeably less oil than before treatment.

I wish it to be understood that I do not intend to imply that the beneficial action of these adsorbent activated carbons is due solely to adsorption. On the contrary, it is my present belief that occlusion or absorption may and probably does take place, although to what extent the beneficial action of these materials is due, if at all, to these or other phenomena I am not now prepared to say.

The molten or liquid sulphur may be brought into the desired intimate contact with the adsorbent activated carbon in any convenient manner, such, for example, as by agitation with the carbon material, or by filtration through a medium composed of or appropriately containing the activated carbon. Activated or decolorizing carbons are known by a great many names some of which designate different grades or types of materials. Some of the names by which activated or decolorizing carbons are known are, activated carbon, decolorizing carbon, animal charcoal, bone char, pit char, activated charcoal and the like, as well as by the trade names "Darco", "Norite", "Nuchar" and the like.

I have found that the so-called decolorizing carbons possess to a marked extent, the properties desirable for the practice of the present invention, and under proper conditions these carbons eliminate dark colored impurities in the sulphur as well as some of the oil therein.

The amount of the activated or decolorizing carbon required in the practice of my invention varies with different materials and with the amount of dark colored impurities and oil to be eliminated from the sulphur. With most of the activated carbons less than 5% by weight on the amount of sulphur treated is usually sufficient to restore the color of the sulphur to the characteristic bright yellow and to remove a part of the oil. In case it is desired to remove more of the oil from the sulphur, larger percentages of the activated carbon may be required or other adsorbents may be added, which have a greater affinity for the oil. Thus, under differing conditions of operation, from 1% to 10%, or even more, of the activated carbon may be used to accomplish the desired results. The activated carbon is most effective in the powdered form.

The temperature at which the sulphur and the activated carbon are brought into contact may vary within wide limits. From an operating standpoint, it is preferable to bring about this contact at temperatures ordinarily now used in handling liquid sulphur, that is, from 240° to 320° F., although better results are usually secured at the lower temperatures. It is to be understood, however, that higher temperatures, or even lower temperatures, may, if desired, be employed in the practice of the present invention.

The time of contact required for improving the color of sulphur and for the removal of the impurities therefrom varies with the particular activated carbon used, with the percentage of the substance used, and with its degree of comminution. With finely divided decolorizing carbons only a few minutes are required to get effective results. With less finely divided decolorizing carbons much longer periods of contact may be required. The time of contact required will also vary with the character of the sulphur treated and with the degree to which it is desired to carry decolorization and oil removal.

The manner in which the necessary contact between the liquid sulphur and the activated carbon used for removing the impurities is brought about may vary according to conditions. In most cases I prefer either to percolate the molten sulphur through a bed of the adsorbent activated carbon, or to agitate the molten sulphur with the activated carbon and afterwards remove the latter by any suitable means such as by settling and decanting, filtering, centrifuging, or the like.

The adsorbent material may be reactivated by dissolving the adsorbed or occluded organic matter and sulphur in a suitable solvent, such, for example, as carbon bisulphide or carbon tetrachloride.

The invention will be further understood by the following table of examples:—

| Activated carbon | Per cent carbon | Agitated | Filtered product | |
|---|---|---|---|---|
| | | | Per cent oil | Color |
| "Darco" | 1 | Crude sulphur 15 min. | 0.044 | 7 |
| "Norite" | 1 | 15 " | 0.036 | 2+ |
| Decolorizing carbon—1 | 1 | 15 " | 0.035 | 2+ |
| Decolorizing carbon—2 | 1 | 15 " | 0.038 | 3 |
| | 1 | 15 " | 0.038 | 2+ |
| "Nuchar" | 3 | Crude sulphur 30 min. | 0.032 | 4+ |
| | 3 | 30 " | 0.022 | 1+ |
| Animal charcoal | 7 | 30 " | 0.032 | 2+ |

The figures given in the foregoing table may be better understood by reference to the following description. The adsorbent activated carbon was mixed with the molten sulphur at a temperature of about 260° F. and thoroughly agitated for the periods designated until the mixture of sulphur and adsorbent was quite intimate. The materials were allowed to stand in contact with each other for a few moments and then the adsorbent and sulphur were separated by filtration. It will be noticed that the oil content has been lowered somewhat and the color number has been reduced from 7 to 3 or better, and in one case nearly to 1.

There being no standard method of determining the gradations of discoloration of sulphur an arbitrary system has been devised and standardized. Long familiarity with these samples enables one to accurately gauge the color of a sample without even a check comparison with the standards maintained for that purpose.

The standards as far as it is possible to describe the colors are as follows:

| Color No. | Ordinary description |
|---|---|
| 1 | Very, very bright. |
| 2 | Very bright. |
| 3 | Bright. |
| 4 | Fairly dark. |
| 5 | Dark. |
| 6 | Very dark. |

From color No. 6 on to No. 10 the shades are proportionately darker.

I claim:

1. The method of improving the color of abnormally colored sulphur which comprises treating the sulphur in a molten condition with finely divided activated carbon, and separating the molten sulphur from the activated carbon, and thereby obtaining sulphur of a color substantially approximating the characteristic normal yellow color.

2. The method of improving the color of abnormally colored sulphur which comprises passing the sulphur in a molten condition through an appropriate bed containing activated carbon whereby the molten sulphur is brought into intimate contact with the activated carbon and the sulphur after passing therethrough is more nearly of the characteristic yellow color of normal colored sulphur.

3. The method of treating sulphur containing impurities, such as small amounts of organic matter, which impart to the sulphur an abnormal color, which comprises bringing the sulphur in a molten condition into intimate contact with activated carbon, and separating the molten sulphur from the activated carbon and thereby obtaining sulphur of a color substantially approximating the characteristic normal yellow color.

4. The method of treating sulphur containing impurities, such as small amounts of organic matter, which impart to the sulphur an abnormal color, which comprises agitating the sulphur while molten in the presence of finely divided activated carbon, and separating the molten sulphur from the activated carbon and thereby obtaining sulphur of a color substantially approximating the characteristic normal yellow color.

5. The method of treating sulphur containing impurities, such as small amounts of organic matter, which impart to the sulphur an abnormal color, which comprises passing the sulphur while molten through a medium containing finely divided decolorizing carbon and thereby substantially improving the color of the sulphur and removing from the sulphur a substantial portion of the impurities.

6. The method of treating sulphur containing impurities, such as small amounts of organic matter, which impart to the sulphur an abnormal color, which comprises bringing decolorizing carbon into intimate contact with the sulphur at a temperature of about 240° F. to about 320° F., and separating the molten sulphur from the decolorizing carbon and thereby obtaining sulphur of a color substantially approximating the characteristic normal yellow color.

7. The method of improving sulphur containing contaminating impurities, which comprises bringing the sulphur in a molten condition into contact with activated carbon and subsequently separating the molten sulphur from the decolorizing carbon and the impurities associated therewith.

8. The method of treating sulphur containing contaminating impurities which comprises passing the sulphur in a molten condition through a medium containing activated carbon and thereby removing a large part of the contaminating impurities from the sulphur.

9. The method of improving the color of abnormally colored sulphur which comprises treating the sulphur in a molten condition with an adsorbent decolorizing carbon and separating the molten sulphur from the adsorbent carbon and thereby obtaining sulphur of a color substantially approximating the characteristic normal yellow color.

10. The method of treating sulphur containing impurities such as small amounts of organic matter, which impart to the sulphur an abnormal color, which comprises bringing an adsorbent activated carbon into intimate contact with the sulphur at a temperature of about 240° F. to about 320° F., and separating the molten sulphur from the adsorbent carbon and thereby obtaining sulphur of a color substantially approximating the characteristic normal yellow color.

In testimony whereof, I affix my signature.

JAMES W. SCHWAB.